US008855595B1

(12) United States Patent
Devling et al.

(10) Patent No.: US 8,855,595 B1
(45) Date of Patent: Oct. 7, 2014

(54) EMERGENCY RADIO

(71) Applicant: Midland Radio Corporation, Kansas City, MO (US)

(72) Inventors: Daniel M. Devling, Liberty, MO (US); David Kim Free, Agency, MO (US); Thomas S. Feurt, Garden City, MO (US)

(73) Assignee: Midland Radio Corporation, Kansas City, MO (US)

( * ) Notice: Subject to any disclaimer, the term of this patent is extended or adjusted under 35 U.S.C. 154(b) by 0 days.

(21) Appl. No.: 13/836,485

(22) Filed: Mar. 15, 2013

(51) Int. Cl.
*H04M 11/04* (2006.01)
*H04B 1/18* (2006.01)
*H04B 1/16* (2006.01)

(52) U.S. Cl.
CPC ........................................ *H04B 1/16* (2013.01)
USPC .................................... 455/404.1; 455/186.1

(58) Field of Classification Search
CPC . H04W 76/007; H04W 4/22; H04H 2201/13; H04H 60/42
USPC .......... 455/179.1, 185.1, 186.1, 404.1, 404.2, 455/456.1, 456.3; 340/6.1, 7.48, 7.58
See application file for complete search history.

(56) References Cited

U.S. PATENT DOCUMENTS

| | | | | |
|---|---|---|---|---|
| 5,444,433 | A | 8/1995 | Gropper | |
| 5,457,816 | A * | 10/1995 | Koyama | 455/186.1 |
| 6,204,761 | B1 | 3/2001 | Vanderable | |
| 7,050,784 | B2 * | 5/2006 | Clark | 455/404.1 |
| 7,233,781 | B2 | 6/2007 | Hunter et al. | |
| 7,333,806 | B2 | 2/2008 | Kingsolver et al. | |
| 7,865,170 | B2 * | 1/2011 | Altizer et al. | 455/404.1 |
| 8,401,514 | B2 * | 3/2013 | Ebdon et al. | 455/404.1 |
| 8,666,362 | B2 * | 3/2014 | Rijnsburger | 455/404.2 |
| 2003/0095639 | A1 | 5/2003 | Vinson | |
| 2003/0174817 | A1 | 9/2003 | Luneau et al. | |
| 2003/0179089 | A1 | 9/2003 | Sweatt | |
| 2004/0058640 | A1 | 3/2004 | Root et al. | |

* cited by examiner

*Primary Examiner* — Quochien B Vuong
(74) *Attorney, Agent, or Firm* — Lathrop & Gage, LLP

(57) ABSTRACT

In one embodiment, an emergency radio includes a processor in data communication with a radio receiver, electronic memory, an input device, an output device, and electronic instructions. The electronic instructions, when executed by the processor, perform steps for: (a) automatically obtaining a SAME code and at least one initial frequency setting for a given location; (b) sampling each of the at least one initial frequency settings using the radio receiver and disregarding any initial frequency setting that fails to meet predetermined criteria, whereby any remaining initial frequency setting is a potential frequency setting; (c) identifying a selected frequency setting from all of the potential frequency settings; (d) storing the SAME code and the selected frequency setting in the electronic memory; and (e) causing all alert data associated with the SAME code and the selected frequency setting to be output.

18 Claims, 9 Drawing Sheets

| Columns → Rows ↓ | A | B | C | D |
|---|---|---|---|---|
| | County | SAME Code | Radio Transmission Location | Frequency (MHz) |
| | | | | |
| 1 | Allen | 20001 | Chanute | 162.4 |
| 2 | Allen | 20001 | Halls Summit | 162.425 |
| 3 | Allen | 20001 | Parker | 162.525 |
| 4 | Anderson | 20003 | Halls Summit | 162.425 |
| 5 | Anderson | 20003 | Parker | 162.525 |
| 6 | Atchison | 20005 | Saint Joseph | 162.4 |
| 7 | Barber | 20007 | Belvidere | 162.525 |
| 8 | Barber | 20007 | Sharon | 162.4 |
| 9 | Douglas | 20045 | Halls Summit | 162.425 |
| 10 | Douglas | 20045 | Kansas City, MO | 162.55 |
| 11 | Douglas | 20045 | Topeka | 162.475 |
| 12 | Edwards | 20047 | Belvidere | 162.525 |
| 13 | Jewell | 20089 | Concordia | 162.55 |
| 14 | Jewell | 20089 | Superior, NE | 162.525 |
| 15 | Johnson | 20091 | Kansas City, MO | 162.55 |
| 16 | Meade | 20119 | Dodge City | 162.475 |
| 17 | Meade | 20119 | Meade | 162.425 |
| 18 | Miami | 20121 | Kansas City, MO | 162.55 |
| 19 | Miami | 20121 | Parker | 162.525 |
| 20 | Woodson | 20207 | Chanute | 162.4 |
| 21 | Woodson | 20207 | Halls Summit | 162.425 |
| 22 | Wyandotte | 20209 | Kansas City, MO | 162.55 |

FIG. 7

EMERGENCY RADIO

BACKGROUND

According to the National Oceanic and Atmospheric Administration (NOAA), there is a continued increase in the severity of weather-related impacts. For example, a growing population and trends such as urban sprawl and conversion of rural land to suburban landscapes increase the likelihood a tornado will impact densely populated areas. And enhanced overlap in the U.S. economy means that a single weather event can have a significant effect on several industries.

When properly used, emergency radios (or "weather radios") have proven to be effective in warning of emergency situations. However, the initial programming of emergency radios can be difficult. Typically, a 6-digit NWR Specific Area Message Encoding county code (generally referred to as "SAME county code" or "SAME county number", and sometimes referred to herein simply as "SAME code") associated with a desired (or "primary") location (typically a county) is identified from a table and input into an emergency radio's memory. Then, the user must input a frequency or channel associated with that SAME code that has a clear transmission to the radio. The radio will become linked to one transmitter associated with the primary location, and updates from that transmitter for the chosen county will be received and presented. Moreover, a user may often be interested in the weather from nearby locations as well, and can typically choose to input additional SAME county codes into the emergency radio's memory. If the additional locations are also associated with the linked transmitter, updates for the additional locations may similarly be received and emitted. If the additional locations are not associated with the linked transmitter, no updates for those locations will be received; radios only become linked with one transmitter. Thus, a false sense of security may result if a user believes that he is monitoring weather in a nearby county but actually is not.

The current invention relates to devices that warn of emergency situations, such as those caused by weather events.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, an emergency radio includes a radio receiver, electronic memory, an input device, an output device, a processor, and electronic instructions. The processor is in data communication with the radio receiver, the electronic memory, the input device, and the output device. The electronic instructions, when executed by the processor, perform steps for: (a) automatically obtaining a SAME code and at least one initial frequency setting for a given location; (b) sampling each of the at least one initial frequency settings using the radio receiver and disregarding any initial frequency setting that fails to meet predetermined criteria, whereby any remaining initial frequency setting is a potential frequency setting; (c) identifying a selected frequency setting from all of the potential frequency settings; (d) storing the SAME code and the selected frequency setting in the electronic memory; and (e) causing all alert data associated with the SAME code and the selected frequency setting to be output.

In another embodiment, an emergency radio includes a radio receiver, electronic memory, an input device, an output device, a processor, and electronic instructions. The processor is in data communication with the radio receiver, the electronic memory, the input device, and the output device. The electronic instructions, when executed by the processor, perform steps for: (a) automatically obtaining a SAME code and at least one initial frequency setting for a given location; (b) identifying one of the initial frequency settings as a selected frequency setting; (c) storing the SAME code and the selected frequency setting in the electronic memory; and (d) causing all alert data associated with the SAME code and the selected frequency setting to be output. No SAME code is provided through the input device.

In still another embodiment, a module for use in an emergency radio includes instructions stored in electronic memory. When executed by at least one processor, the instructions perform steps for: (a) automatically obtaining from electronic memory a SAME code and at least one initial frequency setting for a given location; (b) identifying one of the initial frequency settings as a selected frequency setting; (c) storing the SAME code and the selected frequency setting in electronic memory; and (d) causing all alert data associated with the SAME code and the selected frequency setting to be output. The given location is selected through at least one of: a user input device, a GPS device, and a near field communication device.

BRIEF DESCRIPTION OF THE DRAWINGS

FIG. 7 is a tabulation of SAME county codes for certain exemplary counties and the transmitters associated therewith.

DETAILED DESCRIPTION

Figure 1:
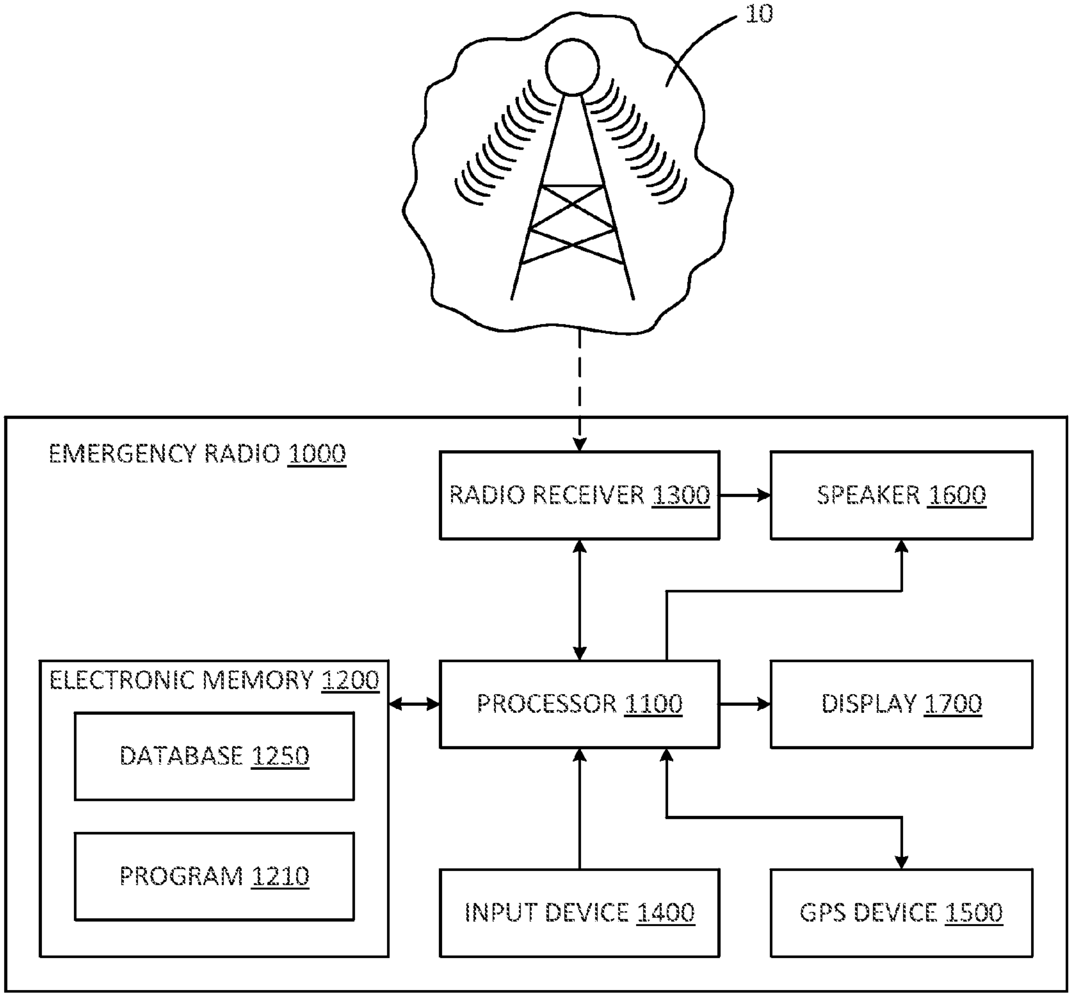
FIG. 1 is a block diagram showing components of an emergency radio according to one embodiment of the current invention, in use.

Emergency radios and methods of programming and operating such emergency radios are set forth herein. FIG. 1 shows a schematic overview of an emergency radio 1000 according to an embodiment of the current invention. In broad terms, the emergency radio 1000 includes a processor 1100 in data communication with electronic memory 1200, a radio receiver 1300, an input device 1400, a GPS device 1500, a speaker 1600, and a display 1700. Those skilled in the art will appreciate that various elements discussed herein may be separated into multiple elements or portions, or may alternately be combined into fewer elements and portions. For example, the processor 1100 may in use be either one processor or multiple processors in communication with one another, or the speaker 1600 may in use be either one speaker or multiple speakers in communication with the processor 1100. Or the input device 1400 and the display 1700 may either be separate devices (for example, the input device 1400 may be a button or keypad, while the display 1700 may be a display) or combined into a single device (e.g., a touchscreen). Such integration and separation is insignificant unless otherwise set forth herein or as would be apparent to one of ordinary skill in the art.

The electronic memory 1200 may include volatile and nonvolatile memory, and any appropriate data storage devices whether now existing or later developed may be used (e.g., RAM, ROM, EEPROM, flash memory, et cetera). As shown in FIG. 1, the electronic memory 1200 may store a software file (or "program") 1210 and a database 1250, which may be any electronic file or combination of electronic files in which data is stored for use by the processor 1100. Among other data, the database 1250 may include a hierarchy of locations (e.g., countries, states, counties), GPS mapping data, SAME county codes, and transmitter frequencies associated with each SAME code. The program 1210 and the database 1250 are each discussed in further detail below. Further, while the country/state/county hierarchy of locations is generally used herein for illustration, those skilled in the art will appreciate that other categories could instead (or additionally) be used, such as city, parish, province, or region.

The radio receiver 1300 may be configured to receive, amplify, and demodulate radio waves from a respective radio transmitter 10 at radio frequencies used for emergency broadcasts (e.g., from 161.650 MHz to 163.275 MHz), and to provide the appropriate demodulated radio waves to the processor 1100 and/or to the speaker 1600. Any such radio receiver 1300, whether now known or later developed, may be used, and some of the functionality of the radio receiver 1300 may be performed by the processor 1100.

The input device 1400 is in data communication with the processor 1100 for providing data from the user to the processor 1100. The GPS device 1500, when utilized, communicates position data (typically latitude and longitude) directly to the processor 1100. The speaker 1600 and the display 1700 are in data communication with the processor 1100 for providing data from the processor 1100 to the user. The input device 1400 may be, for example, one or more buttons, knobs, microphones, et cetera. The display 1700 may be, for example, a liquid crystal display, a LED display, et cetera.

Focus is now directed to FIGS. 2 through 6, which illustrate various steps that the program 1210 causes the processor 1100 to undertake. Those skilled in the art will appreciate that various steps shown and described can occur in different orders, and that some steps may be omitted or combined. Further, steps such as selecting language and setting a clock may of course be incorporated in the setup process; the discussed steps do not foreclose additional steps.

Figure 2:
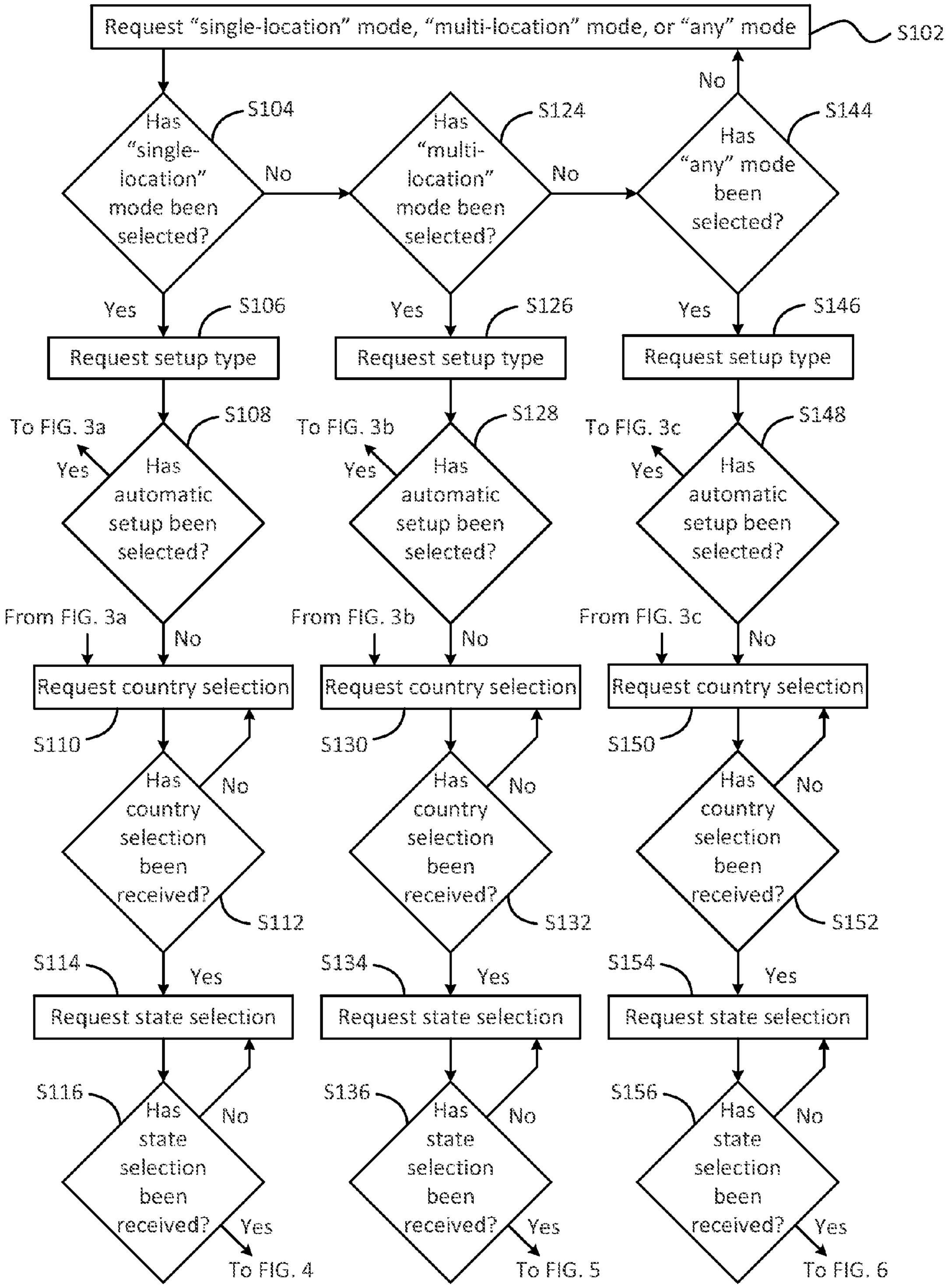
FIGS. 2 through 6 are a flow chart showing an exemplary set of steps performed by the emergency radio of FIG. 1.
Figure 3A:
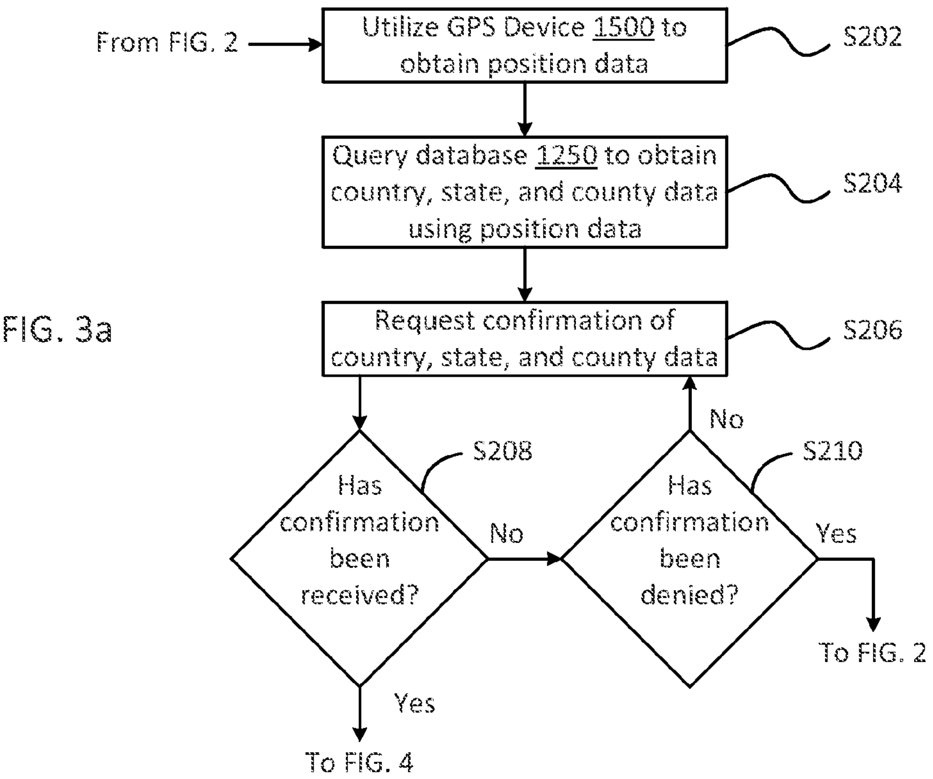
Figure 3B:
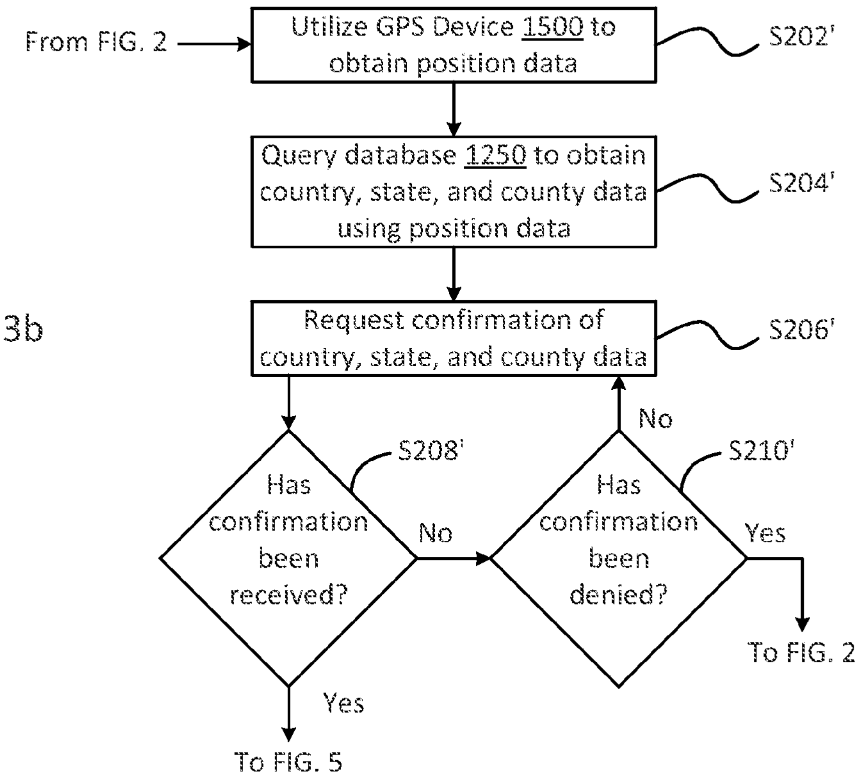
Figure 3C:
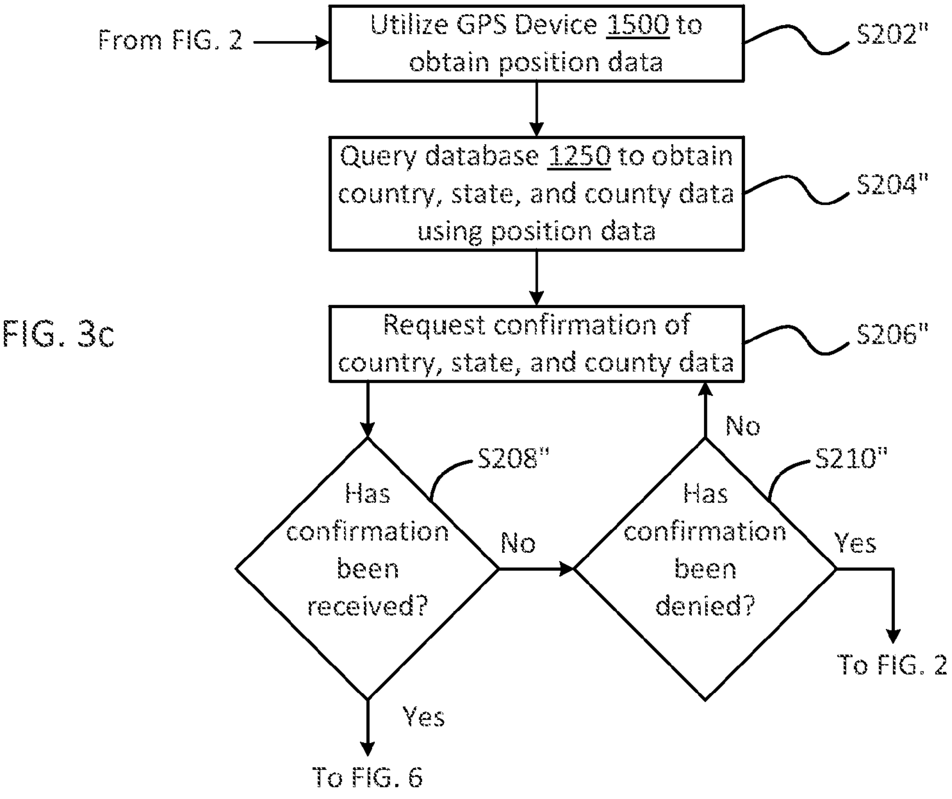

At step S102, shown at FIG. 2, the processor 1100 causes the display 1700 to request a selection of "single-location" mode, "multi-location" mode, or "any" mode. At step S104, the processor 1100 determines if single-location mode has been selected (through the input device 1400), at step S124 the processor 1100 determines if multi-location mode has been selected (through the input device 1400), and at step S144 the processor 1100 determines if any mode has been selected (through the input device 1400). The process continues to loop through steps S104, S124, S144 until a selection is received. If the processor 1100 determines at step S104 that single-location mode has been selected, the process moves to step S106; if the processor 1100 determines at step S124 that multi-location mode has been selected, the process moves to step S126; and if the processor 1100 determines at step S144 that any mode has been selected, the process moves to step S146.

At step S106, the processor 1100 causes the display 1700 to request setup type. If the processor 1100 then determines at step S108 that automatic setup has been selected (through the input device 1400), the process moves to step S202 which is described in additional detail below. If the processor 1100 instead determines at step S108 that automatic setup has not been selected, the process continues to step S110.

At step S110, the processor 1100 causes the display 1700 to request country selection. The process then continues to step S112, where the processor 1100 determines whether a country selection has been received (from the input device 1400). If no country selection has been received, the processor 1100 again causes the display 1700 to request country selection at step S110. This continues until the processor 1100 determines that a country selection has been made at step S112. From step S112, the process continues to step S114.

Figure 4:
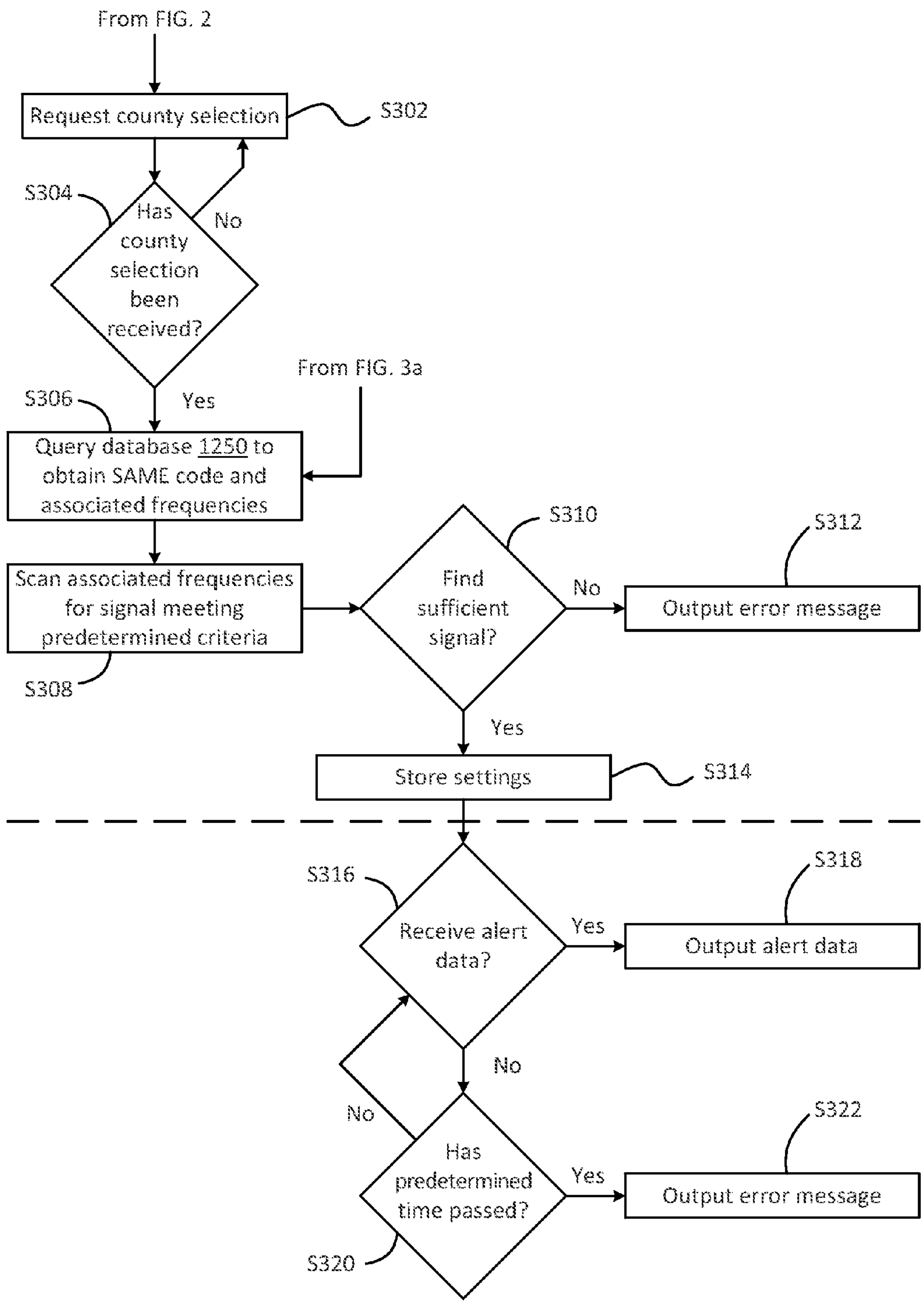

At step S114, the processor 1100 causes the display 1700 to request state selection. If the processor 1100 then determines at step S116 that a state selection has been made (through the input device 1400), the process continues to step S302 (FIG. 4). If no selection has been received, the processor 1100 causes the display 1700 to re-request state selection at step S114; this continues until the processor 1100 receives a state selection at step S116.

At step S302 (FIG. 4), the processor 1100 causes the display 1700 to request county selection. If the processor 1100 determines at step S304 that a county selection has been made, the processor 1100 queries the database 1250 to obtain a SAME county code and associated frequencies at step S306; the process then continues to step S308. If no county selection has been received at step S304, the processor 1100 causes the display 1700 to re-request county selection at step S302.

At step S308, the processor 1100 uses the receiver 1300 and scans the frequencies associated with the SAME county code for a signal meeting predetermined criteria (e.g., at least a minimum strength or a strongest signal). The processor 1100 then determines whether a sufficient signal has been found (step S310). If a sufficient signal has not been found, the processor 1100 causes the display 1700 to output an error message at step S312. The process may then end at step S312, or may return to a prior step (e.g., step S308). If a sufficient signal has been found, the process moves from step S310 to step S314, where the processor 1100 communicates the signal data (e.g., the SAME county code and the signal frequency) to the electronic memory 1200 for storage. The process then continues to step S316.

FIG. 4 includes a dashed line between steps S314, S316 to distinguish generally between setting up the emergency radio 1000 and later operational use of the emergency radio 1000. At step S316, the processor 1100 determines whether valid alert data is received (via the receiver 1300). If so, the processor 1100 causes the speaker 1600 and the display 1700 to output the alert data, as shown in step S318. The process may then typically return to step S316 from step S318. If valid alert data is not received at step S316, the processor continues to step S320 where it determines if the receiver 1300 has failed to receive a valid data signal 10 for a pre-determined amount of time, such as ten days. If so, the processor 1100 causes the display 1700 to output an error message (step S322). The process may then end at step S322, or may return to a prior step (e.g., step S316). If the processor 1100 does not determine an error condition at step S320, the process returns to step S316. In addition to failing to receive a valid data signal 10 for a predetermined amount of time, an error condition may also include such things as determining the strength of the signal 10 is below a certain threshold, or determining that a battery powering the processor 1100 is low on power.

Returning now to step S124 at FIG. 2, if multi-location mode has been selected, the process continues to step S126 where the processor 1100 causes the display 1700 to request setup type. If the processor 1100 then determines at step S128 that automatic setup has been selected (through the input device 1400), the process moves to step S202' which is described in additional detail below. If the processor 1100 instead determines at step S128 that automatic setup has not been selected, the process continues to step S130.

At step S130, the processor 1100 causes the display 1700 to request country selection. The process then continues to step S132, where the processor 1100 determines whether a country selection has been received (from the input device 1400). If no country selection has been received, the processor 1100 again causes the display 1700 to request country selection at step S130. This continues until the processor 1100 determines that a country selection has been made at step S132. From step S132, the process continues to step S134.

Figure 5:
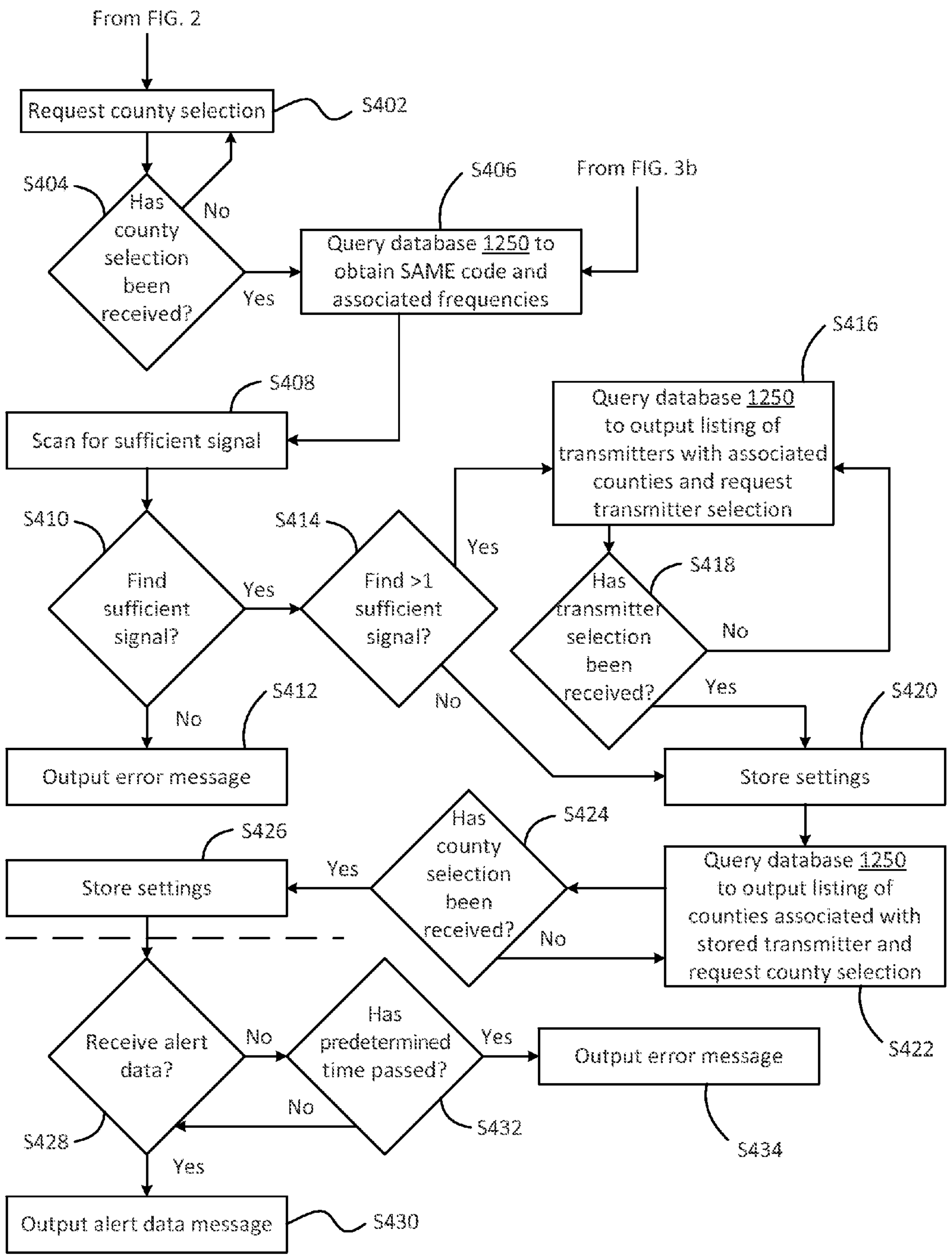

At step S134, the processor 1100 causes the display 1700 to request state selection. If the processor 1100 then determines at step S136 that a state selection has been made (through the input device 1400), the process continues to step S402 (FIG. 5). If no selection has been received, the processor 1100 causes the display 1700 to re-request state selection at step S134; this continues until the processor 1100 receives a state selection at step S136.

At step S402 (FIG. 5), the processor 1100 causes the display 1700 to request county selection. If the processor 1100 determines at step S404 that a county selection has been made, the processor 1100 queries the database 1250 to obtain a SAME county code and associated frequencies at step S406; the process then continues to step S408. If no county selection has been received at step S404, the processor 1100 causes the display 1700 to re-request county selection at step S402.

At step S408, the processor 1100 uses the receiver 1300 and scans the frequencies associated with the SAME county code for a signal meeting predetermined criteria (e.g., at least a minimum strength or a strongest signal). The processor 1100 then determines whether a sufficient signal has been found (step S410). If a sufficient signal has not been found, the processor 1100 causes the display 1700 to output an error message at step S412. The process may then end at step S412, or may return to a prior step (e.g., step S408). If at least one sufficient signal has been found, the process continues from step S410 to step S414.

At step S414, the processor 1100 determines whether more than one sufficient signal 10 has been found. If only one signal 10 has been found, the process moves to step S420. If more than one signal has been found, the processor 1100 queries the database 1250 at step S416 and causes the display 1700 to output a listing of transmitters with their associated counties and a request for transmitter selection. Once the processor 1100 determines at step S418 that a transmitter selection has been received, the process moves to step S420; otherwise, the process returns to step S416.

At step S420, the processor 1100 directs the electronic memory 1200 to store the channel and selected county. The process then continues to step S422.

At step S422, the processor 1100 queries the database 1250 and causes the display 1700 to output a listing of counties associated with the stored channel and request another county selection. Once the processor 1100 determines at step S424 that another county selection has been made, the process moves to step S426 where the processor 1100 communicates the additional county selection to the electronic memory 1200 for storage; otherwise, the process returns to step S422. The process continues from step S426 to step S428.

FIG. 5 includes a dashed line between steps S426, S428 to distinguish generally between setting up the emergency radio 1000 and later operational use of the emergency radio 1000. At step S428, the processor 1100 determines whether valid alert data is received (via the receiver 1300). If so, the processor 1100 causes the speaker 1600 and the display 1700 to output the alert data, as shown in step S430. The process may then typically return to step S428 from step S430. If valid alert data is not received at step S428, the processor continues to step S432 where it determines if the receiver 1300 has failed to receive a valid data signal 10 for a pre-determined amount of time, such as ten days. If so, the processor 1100 causes the display 1700 to output an error message (step S434). The process may then end at step S434, or may return to a prior step (e.g., step S428). If the processor 1100 does not determine an error condition at step S432, the process returns to step S428. In addition to failing to receive a valid data signal 10 for a predetermined amount of time, an error condition may also include such things as determining the strength of the signal 10 is below a certain threshold, or determining the battery powering the processor 1100 is low on power.

Returning once again to FIG. 2, if the processor 1100 determines at step S144 that “any” mode (i.e., that the user wants as many alerts as possible) has been selected, the process continues to step S146 where the processor 1100 causes the display 1700 to request setup type. If the processor 1100 then determines at step S148 that automatic setup has been selected (through the input device 1400), the process moves to step S202" which is described in additional detail below. If the processor 1100 instead determines at step S148 that automatic setup has not been selected, the process continues to step S150.

At step S150, the processor 1100 causes the display 1700 to request country selection. The process then continues to step S152, where the processor 1100 determines whether a country selection has been received (from the input device 1400). If no country selection has been received, the processor 1100 again causes the display 1700 to request country selection at step S150. This continues until the processor 1100 determines that a country selection has been made at step S152. From step S152, the process continues to step S154.

Figure 6:
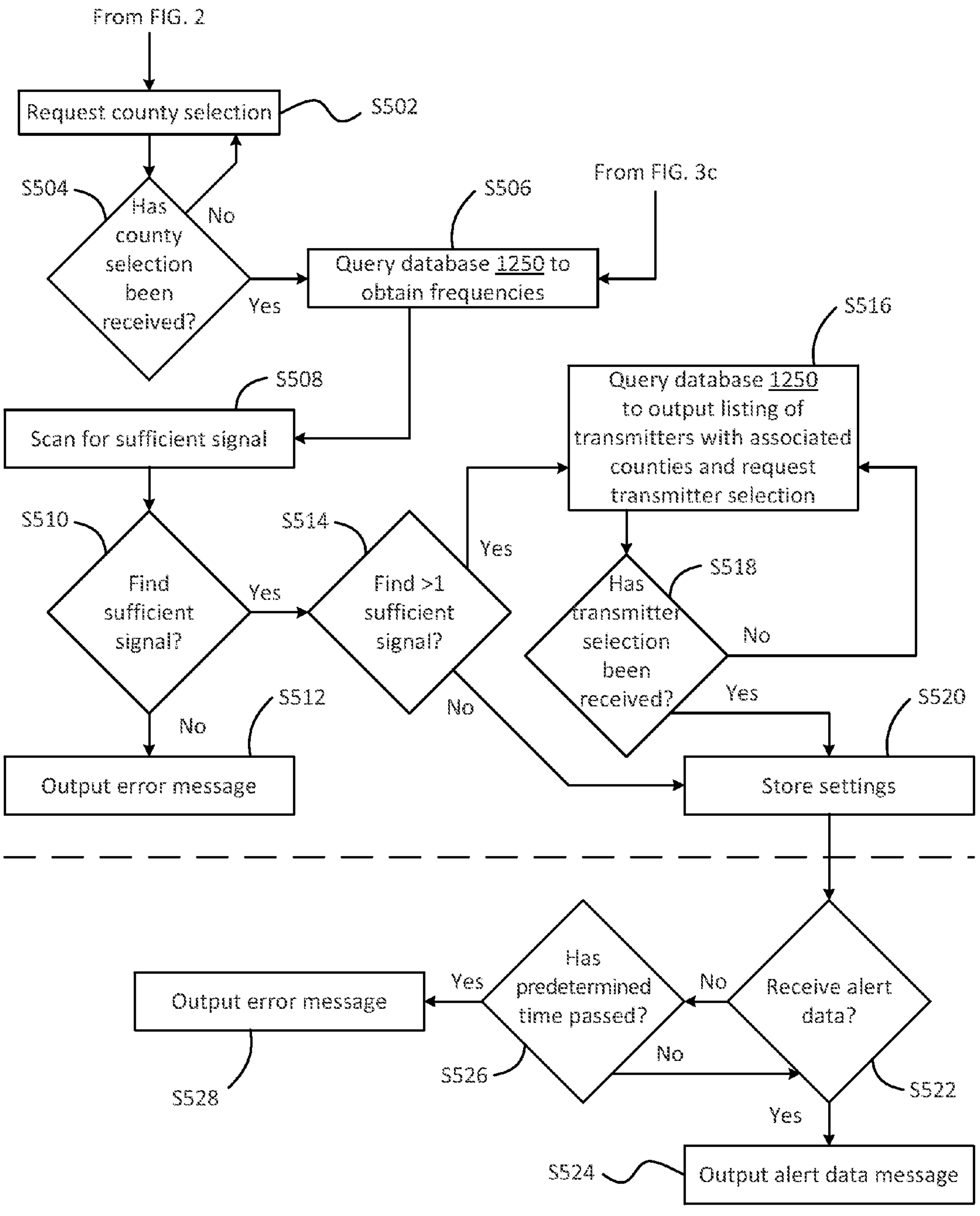

At step S154, the processor 1100 causes the display 1700 to request state selection. If the processor 1100 then determines at step S156 that a state selection has been made (through the input device 1400), the process continues to step S502 (FIG. 6). If no selection has been received, the processor 1100 causes the display 1700 to re-request state selection at step S154; this continues until the processor 1100 receives a state selection at step S156.

At step S502 (FIG. 6), the processor 1100 causes the display 1700 to request county selection. If the processor 1100 determines at step S504 that a county selection has been made, the processor 1100 queries the database 1250 to obtain frequencies associated with the county at step S506; the process then continues to step S508. If no county selection has been received at step S504, the processor 1100 causes the display 1700 to re-request county selection at step S502.

At step S508, the processor 1100 uses the receiver 1300 and scans various frequencies for a signal meeting predetermined criteria (e.g., at least a minimum strength or a strongest signal). The processor 1100 then determines whether a sufficient signal has been found (step S510). If a sufficient signal has not been found, the processor 1100 causes the display 1700 to output an error message at step S512. The process may then end at step S512, or may return to a prior step (e.g., step S508). If at least one sufficient signal has been found, the process continues from step S510 to step S514.

At step S514, the processor 1100 determines whether more than one sufficient signal 10 has been found. If only one signal 10 has been found, the process moves to step S520. If more than one signal has been found, the processor 1100 queries the database 1250 at step S516 and causes the display 1700 to output a listing of transmitters with their associated counties and a request for transmitter selection. Once the processor 1100 determines at step S518 that a transmitter selection has been received, the process moves to step S520; otherwise, the process returns to step S516.

At step S520, the processor 1100 directs the electronic memory 1200 to store the channel. The process then continues to step S522.

FIG. 6 includes a dashed line between steps S520, S522 to distinguish generally between setting up the emergency radio 1000 and later operational use of the emergency radio 1000. At step S522, the processor 1100 determines whether valid alert data is received (via the receiver 1300). If so, the processor 1100 causes the speaker 1600 and the display 1700 to output the alert data, as shown in step S524. The process may then typically return to step S522 from step S524. If valid alert data is not received at step S522, the processor continues to step S526 where it determines if the receiver 1300 has failed to receive a valid data signal 10 for a pre-determined amount of time, such as ten days. If so, the processor 1100 causes the display 1700 to output an error message (step S528). The process may then end at step S528, or may return to a prior step (e.g., step S522). If the processor 1100 does not determine an error condition at step S526, the process returns to step S522. In addition to failing to receive a valid data signal 10 for a predetermined amount of time, an error condition may also include such things as determining the strength of the signal 10 is below a certain threshold, or determining the battery powering the processor 1100 is low on power.

Attention is now directed back to FIG. 2, and specifically to steps S108, S128, S148 in the "single-location", "multi-location", and "any" modes, respectively. If the processor 1100 determines that automatic setup was selected in either step S108, S128, or S148, the steps described above are altered as shown in FIGS. 3*a* through 3*c*. Because the alternate steps in the three modes may generally correspond to one another, they are discussed concurrently herein.

Once automatic setup is detected at either step S108, step S128, or step S148, the processor 1100 references position data (typically latitude and longitude) directly from the GPS device 1500 (S202, S202', S202") and queries the database 1250 to obtain country, state, and county data using the position data (S204, S204', S204"). The processor 1100 then causes the display 1700 to request confirmation of country, state, and county data (S206, S206', S206"). The process proceeds to enter a loop (S208, S210, S206; S208', S210', S206'; S208", S210", S206") to determine if responsive input has been received, and if so, how to continue. If the processor 1100 determines that confirmation has not been received (at steps S208, S208', S208"), and that confirmation has instead been denied (at steps S210, S210', S210"), the process returns to step S110 in FIG. 2 for the single-location mode, to step S130 in FIG. 2 for the multi-location mode, and to step S150 in FIG. 2 for the any mode, and continues as discussed above (as if automatic setup had not been selected at step S108, S128, S148). If the processor 1100 instead determines that confirmation has been received, the process moves to step S306 (FIG. 4) for the single-location mode, to step S406 (FIG. 5) for the multi-location mode, and to step S506 (FIG. 6) for the any mode.

Exemplary operation of the emergency radio 1000 in the single-location mode, the multi-location mode, and the any mode is now set forth with additional reference to FIG. 7. FIG. 7 includes a spreadsheet outlining frequencies (Column D) associated with particular radio transmission locations (Column C) in certain counties (Column A) in the State of Kansas of the United States, and the SAME codes (Column B) for these counties. To facilitate discussion of the three modes, it may be helpful to identify certain rows, columns, and discrete cells of the spreadsheet of FIG. 7. The discrete cells will be referred to herein by their Column number and Row number. For example, Row 9 outlines that Douglas County (Cell A9) has a SAME code of 20045 (Cell B9), and that the Halls Summit radio transmission channel (Cell C9) associated with Douglas County transmits at a frequency of 162.425 MHz (Cell D9). People of skill in the art will appreciate that FIG. 7 provides only an exemplary grouping, and that a particular state may include any number of counties, each being associated with any number of transmitters.

Assume now, for example, that a user of the emergency radio 1000 desires to receive alert data from Douglas County, Kans. The user may select the single-location mode (step S104), and if the user does not opt for automatic setup (at step S106), the processor 1100 may cause the display 1700 to request country selection (step S110) from the user. The user may select the United States via the input device 1400, and the processor 1100 may cause the display 1700 to request state selection (step S114) from the user. The user may use the input device 1400 to select the State of Kansas, and the processor 1100 may cause the display 1700 to request county selection (step S302) from the user. The user may select Douglas County.

The processor 1100 may then query the database 1250 to obtain the SAME code for Douglas County and the transmitter frequencies associated therewith (step S306). For example, the processor 1100 may query the database 1250 and obtain the SAME code 20045 (Cells B9, B10, and B11) for Douglas County, and the frequencies 162.425 MHz (Cell D9 of the Halls Summit radio transmission channel (Cell C9)), 162.55 MHz (Cell D10, associated with the Kansas City, Mo. radio transmission channel at Cell C10), and 162.475 MHz (Cell D11, associated with the Topeka radio transmission channel at Cell C11) associated with the SAME code 20045. The processor 1100 may use the receiver 1300 to scan the signal at each of these frequencies (step S308) to determine whether a signal meets predetermined criteria (e.g., meets a minimum requirement or is the strongest signal). For purposes of this illustration, we shall assume that the signal being transmitted at 162.55 MHz from the Kansas City, Mo. radio transmission channel (Cell C10) is stronger at the reception location than the signals being transmitted by the Halls Summit radio transmission channel (Cell C9) and the Topeka radio transmission channel (Cell C11). If the processor 1100 determines that the signal being transmitted at 162.55 MHz from the Kansas City, Mo. radio transmission channel (Cell C10) is of sufficient strength (step S310), it may store its settings (e.g., SAME code 20045 and frequency 162.55 MHz) in electronic memory 1200 (step S314). Then, if valid alert data is received via the receiver 1300 for the SAME code 20045 at the 162.55 MHz frequency (step S316), the processor 1100 may cause the speaker 1600 and/or the display 1700 to output this alert data (step S318). If, conversely, valid alert data is not received for a predetermined amount of time (e.g., ten days), the processor 1100 may cause the display 1700 (and/or the speaker 1600) to output an error message (step S322).

Assume now that the user selects the multi-location mode (step S124) instead of the single-location mode, and does not opt for automatic setup (step S128). The processor 1100 may cause the display 1700 to request country selection (step S130) from the user. The user may select the United States via the input device 1400, and the processor 1100 may cause the display 1700 to request state selection (step S134) from the user. The user may use the input device 1400 to select the State of Kansas, and the processor 1100 may cause the display 1700 to request county selection (step S402) from the user. The user may select Douglas County.

The processor 1100 may then query the database 1250 to obtain the SAME code for Douglas County and the transmitter frequencies associated therewith (step S406). For example, the processor 1100 may query the database 1250 and obtain the SAME code 20045 (Cells B9, B10, and B11) for Douglas County, and the frequencies 162.425 MHz (Cell D9, associated with the Halls Summit radio transmission channel Cell C9), 162.55 MHz (Cell D10, associated with the Kansas City, Mo. radio transmission channel Cell C10), and 162.475 MHz (Cell D11, associated with the Topeka radio transmission channel Cell C11) associated with the SAME code 20045. The processor 1100 may use the receiver 1300 to scan the signal at each of these frequencies (step S408) to determine whether one or more signals meet predetermined criteria. For this example, we shall assume that the processor 1100 determines that the signals being transmitted by the Halls Summit radio transmission channel (Cell C9) at 162.425 MHz (Cell D9), and the Kansas City, Mo. radio transmission channel (Cell C10) at 162.55 MHz (Cell D10) are of sufficient strength when received. The processor 1100 may query the database 1250 and output on the display 1700 these transmission channels and any additional counties associated with these transmission channels. For example, the processor 1100 may cause the display 1700 to output that the Kansas City, Mo. radio transmission channel (Cell C10) transmitting at a frequency of 162.55 MHz (Cell D10) is also associated with Johnson County (Row 15), Miami County (Row 18) and Wyandotte County (Row 22), and that the Halls Summit radio transmission channel (Cell C9) transmitting at a frequency of 162.425 MHz is further associated with Allen County (Row 2), Anderson County (Row 4), and Woodson County (Row 21).

Assume now that the user selects the Kansas City, Mo. radio transmission channel. The processor 1100 may cause the settings for this transmission channel (e.g., SAME code 20045 and frequency 162.55 MHz) to be stored in electronic memory (step S420). Then, the processor 1100 may cause the display 1700 to output a listing of other counties associated with the Kansas City, Mo. radio transmission channel (step S422) and ask the user to select from these additional counties. For example, the processor 1100 may cause the display 1700 to list that the Kansas City, Mo. radio transmission channel is also associated with Johnson County (Row 15), Miami County (Row 18) and Wyandotte County (Row 22). Assume that the user selects Johnson County. Once the processor 1100 determines that an additional county has been selected (step S424), it may store the new settings (e.g., the SAME code 20091 for Johnson County) in the electronic memory 1200 (S426). Then, if valid alert data is received via the receiver 1300 for the SAME code 20045 at the 162.55 MHz frequency and/or the SAME code 20091 at the 162.55 MHz frequency, the processor 1100 will cause the speaker 1600 and the display 1700 to output this alert data (step S430). Alternatively, if valid alert data is not received for a predetermined amount of time (e.g., ten days), the processor 1100 may cause the display 1700 (and/or the speaker 1600) to output an error message (step S434).

Continuing, we shall now assume now that the user selects the any mode (step S144) instead of the single-location mode or the multi-location mode, and does not opt for automatic setup (step S148). The processor 1100 may cause the display 1700 to request country selection (step S150) from the user. The user may select the United States via the input device 1400, and the processor 1100 may cause the display 1700 to request state selection (step S154) from the user. The user may use the input device 1400 to select the State of Kansas, and the processor 1100 may cause the display 1700 to request county selection (step S502) from the user. The user may select Douglas County.

The process 1100 may then query the database 1250 to obtain the SAME code for Douglas County and the transmitter frequencies associated therewith (step S506). For example, the processor 1100 may query the database 1250 and obtain the SAME code 20045 (Cells B9, B10, and B11), and the frequencies 162.425 MHz (Cell D9, associated with the Halls Summit radio transmission channel Cell C9), 162.55 MHz (Cell D10, associated with the Kansas City, Mo. radio transmission channel Cell C10), and 162.475 MHz (Cell D11, associated with the Topeka radio transmission channel Cell C11) associated with the SAME code 20045. The processor 1100 may use the receiver 1300 to scan the signal at each of these frequencies (step S508) to determine whether one or more signals meet predetermined criteria. Assume that the processor 1100 determines (at step S514) that the signals being transmitted by the Halls Summit radio transmission channel (Cell C9) at 162.425 MHz (Cell D9), and the Kansas City, Mo. radio transmission channel (Cell C10) at 162.55 MHz (Cell D10) are of sufficient strength. The processor 1100 may cause the display 1700 to output these radio channels (step S516). Assume that the user selects the Halls Summit radio transmission channel (Cell C9) via the input device 1400. The processor 1100 may cause the corresponding frequency to be stored in the electronic memory 1250 (step S520). Then, if valid alert data is received via the receiver 1300 for any SAME code on this frequency, the speaker 1600 and display 1700 will output the alert data (step S524). Alternatively, if valid alert data is not received for a predetermined amount of time (e.g., five days), the processor 1100 may cause the display 1700 (and/or the speaker 1600) to output an error message (step S528).

If automatic setup had been selected (at step S108, S128, or S148), the GPS device would have obtained position data (in the above example, the latitude and longitude for Douglas County, Kans.) at step S202, 202', 202", and the database 1250 would have been queried to obtain country/state/county data (step S204, S204', S204"). The user then could have confirmed (S208, 208', 208") or rejected (S210, 210', 210") the location. Confirmation would take the user further into the setup process (step S306, S406, or S506), while rejection would send the user back to make manual selections (steps SS110, S130, S150).

Figure 8:
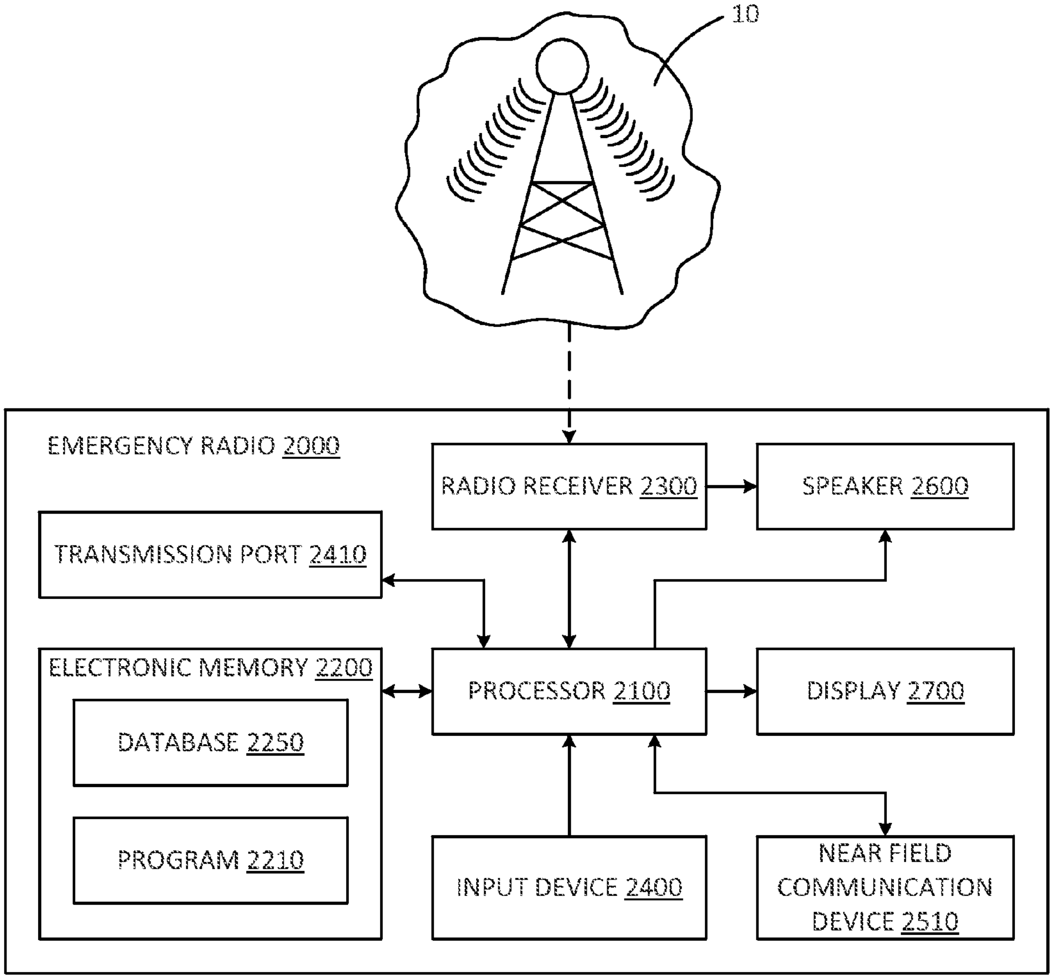
FIG. 8 is a block diagram showing components of an emergency radio according to another embodiment of the current invention, in use.

FIG. 8 shows another emergency radio 2000 that is substantially similar to the embodiment 1000, except as specifically noted and/or shown, or as would be inherent. Further, those skilled in the art will appreciate that the embodiment 1000 (and thus the embodiment 2000) may be modified in various ways, such as through incorporating all or part of any of the various described features and embodiments, for example. For uniformity and brevity, reference numbers between 2000 and 2999 may be used to indicate parts corresponding to those discussed above numbered between 1000 and 1999 (e.g., housing processor 2100 corresponds generally to the processor 1100), though with any noted or shown deviations.

In embodiment 2000, the GPS device 1500 is replaced by a near field communication device 2510. A radio frequency (RF) transceiver, transmitter-receiver, or any other appropriate device 2510, whether now existing or later developed, that allows communication with another apparatus (e.g., a cellular telephone) having a complementary near field communication device may be used. "Near field communication" is used herein to refer to communication that only occurs when complementary devices are touched or in close proximity (usually no more than a few centimeters).

In operation, the emergency radio 2000 functions in automatic setup—and specifically steps S202, S202', S202"—by interacting with an external GPS device (e.g., housed in a cellular telephone) through the near field communication device 2510. Thus, providing the GPS device 1500 in the emergency radio 2000 may be unnecessary.

The emergency radio 2000 may further include a transmission port 2410 in data communication with the processor 2100. The transmission port 2410 may be a USB port, a memory card slot, or any other appropriate port, whether now existing or later developed. In use, the port 2410 may be used to transfer settings to the processor 2100 (for storage in the memory 2200), and/or from the processor 2100 (and ultimately the memory 2200). The transferred settings may be stored, for example, on a USB drive or a memory card, and the settings may include various types of data. In some cases, the settings may be limited to general operational settings such as language and other user preferences. In other cases, the settings may include location data or even all settings required to setup the emergency radio 2000 for operation.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Various steps in described methods may be undertaken simultaneously or in other orders than specifically provided. While various programming has been described as enabling specific functions, those skilled in the art will appreciate that files and software may be commingled or further segregated, and that specific file or software labels are used for convenience.

We claim:

1. An emergency radio, comprising:
a radio receiver;
electronic memory;
an input device;
an output device;
a processor in data communication with the radio receiver, the electronic memory, the input device, and the output device; and
electronic instructions that, when executed by the processor, perform steps for:
(a) automatically obtaining a SAME code and at least one initial frequency setting for a given location;
(b) sampling each of the at least one initial frequency settings using the radio receiver and disregarding any initial frequency setting that fails to meet predetermined criteria, whereby any remaining initial frequent satin is a potential frequency setting;
(c) identifying a selected frequency setting from all of the potential frequency settings;
(d) storing the SAME code and the selected frequency setting in the electronic memory;
(e) causing all alert data associated with the SAME code and the selected frequency setting to be output;
(f) automatically obtaining a listing of additional locations associated with the selected frequency setting and the given location, and outputting the listing of additional locations through the output device;
(g) identifying at least one of the additional locations from the listing of additional locations based on user input from the input device, whereby each additional location identified is a secondary location;
(h) automatically obtaining a SAME code for each secondary location, and storing the SAME code for each secondary location in the electronic memory; and
(i) causing all alert data associated with the SAME code for each secondary location and the selected frequency setting to be output.

2. The emergency radio of claim 1, wherein:
there is only one potential frequency setting; and
the step of identifying a selected frequency setting from all of the potential frequency settings is automatically choosing the one potential frequency setting.

3. The emergency radio of claim 1, wherein the step of identifying a selected frequency setting from all of the potential frequency settings is identifying a selected frequency setting from all of the potential frequency settings based on user input from the input device.

4. The emergency radio of claim 1, wherein the step of identifying a selected frequency setting from all of the potential frequency settings includes:
(c1) automatically obtaining a listing of additional locations associated with each potential frequency setting, and outputting the potential frequency settings and the listing of additional locations through the output device; and
(c2) identifying a selected frequency setting from all of the potential frequency settings based on user input from the input device.

5. The emergency radio of claim 1, further comprising electronic instructions that, when executed by the processor, perform steps for causing all alert data associated with the selected frequency setting to be output.

6. The emergency radio of claim 1, wherein the emergency radio further comprises a GPS device; and further comprising electronic instructions that, when executed by the processor, perform steps for selecting the given location using the GPS device.

7. The emergency radio of claim 1, wherein the given location is identified based on user input from the input device.

8. The emergency radio of claim 1, wherein the emergency radio further comprises a near field communication device; and further comprising electronic instructions that, when executed by the processor, perform steps for selecting the given location using the near field communication device.

9. An emergency radio, comprising:
a radio receiver;
electronic memory;
an input device;
an output device;
a processor in data communication with the radio receiver, the electronic memory, the input device, and the output device; and
electronic instructions that, when executed by the processor, perform steps for:
(a) automatically obtaining a SAME code and at least one initial frequency setting for a given location;
(b) identifying one of the initial frequency settings as a selected frequency setting;

(c) storing the SAME code and the selected frequency setting in the electronic memory;

(d) causing all alert data associated with the SAME code and the selected frequency setting to be output;

(e) automatically obtaining a listing of additional locations associated with the selected frequency setting and the given location, and outputting the listing of additional locations through the output device;

(f) identifying at least one of the additional locations from the listing of additional locations based on user input from the input device, whereby each additional location identified is a secondary location;

(g) automatically obtaining a SAME code for each secondary location, and storing the SAME code for each secondary location in the electronic memory; and (h) causing all alert data associated with the SAME code for each secondary location and the selected frequency setting to be output;

whereby a user is prohibited from selecting a secondary location which is not associated with the selected frequency;

wherein no SAME code is provided through the input device.

10. The emergency radio of claim 9, wherein the emergency radio further comprises a GPS device; and further comprising electronic instructions that, when executed by the processor, perform steps for selecting the given location using the GPS device.

11. The emergency radio of claim 9, wherein the emergency radio further comprises a near field communication device; and further comprising electronic instructions that, when executed by the processor, perform steps for selecting the given location using the near field communication device.

12. The emergency radio of claim 9, wherein the given location is identified based on user input from the input device.

13. The emergency radio of claim 9, further comprising electronic instructions that, when executed by the processor, perform steps for causing all alert data associated with the selected frequency setting to be output.

14. The emergency radio of claim 9 further comprising electronic instructions that, when executed by the processor, perform steps for outputting an error message when no alert data is received by the radio receiver for a predetermined amount of time.

15. The emergency radio of claim 14, wherein the predetermined amount of time is ten days.

16. The emergency radio of claim 14, further comprising electronic instructions that, when executed by the processor, perform steps for outputting an error condition when a signal strength at the selected frequency setting falls below a threshold.

17. A module for use in an emergency radio, the module comprising instructions, stored in electronic memory, wherein the instructions, when executed by at least one processor, perform steps for:

(a) automatically obtaining a SAME code and at least one initial frequency setting for a given location; the SAME code and the at least one initial frequency setting being obtained from electronic memory; the given location being selected through at least one of: a user input device, a GPS device, and a near field communication device;

(b) identifying one of the initial frequency settings as a selected frequency setting;

(c) storing the SAME code and the selected frequency setting in electronic memory; and (d) causing all alert data associated with the SAME code and the selected frequency setting to be output;

wherein the instructions prohibit a user from selecting a secondary location which is not associated with the selected frequency.

18. The module of claim 17, wherein the instructions do not utilize any SAME code provided by a user through an input device.

* * * * *